United States Patent [19]
Brazier

[11] Patent Number: 4,869,354
[45] Date of Patent: Sep. 26, 1989

[54] FLYWHEEL DISENGAGEMENT ASSEMBLY

[76] Inventor: Glen Brazier, 518 S. Arnold, Thief River Falls, Minn. 56701

[21] Appl. No.: 26,960

[22] Filed: Mar. 17, 1987

[51] Int. Cl.⁴ .................................................. F16D 11/00
[52] U.S. Cl. ................................... 192/67 R; 74/7 C; 123/179 R; 192/84 R; 192/99 S
[58] Field of Search ................. 192/67 R, 99 S, 84 R; 74/572, 7 C, 9; 123/179 J, 179 R, 179 CC

[56] References Cited

U.S. PATENT DOCUMENTS

| | | | |
|---|---|---|---|
| 2,684,741 | 7/1954 | Gregory | 192/67 R |
| 2,742,127 | 4/1956 | Mumford | 192/67 R |
| 3,603,436 | 9/1971 | Bartholomew | 192/67 R |
| 3,862,677 | 1/1975 | Bahr | 74/572 |
| 3,886,810 | 6/1975 | Sugiyama | 74/572 |
| 4,262,552 | 4/1981 | Honda | 192/103 F |
| 4,440,281 | 4/1984 | Hauguth | 74/7 C |
| 4,499,965 | 2/1985 | Oetting | 74/572 |

Primary Examiner—Rodney H. Bonck
Attorney, Agent, or Firm—Douglas L. Tschida

[57] ABSTRACT

Apparatus for selectively coupling a ring gear to the drive train of a race car to effectuate engine start; generally comprising a geared flywheel retaining hub slidably mounted along a slideway between an adapter assembly bolted to the transmission and a geared drive hub bolted to the crankshaft. An intermediate shift actuator pivotally coupled to the adapter assembly and flywheel retaining hub selectively engages/disengages the flywheel from the starter drive and drive train.

12 Claims, 3 Drawing Sheets

FLYWHEEL DISENGAGEMENT ASSEMBLY

BACKGROUND OF THE INVENTION

The present invention relates to automotive engine starting apparatus and, in particular, to apparatus for starting race cars.

Two of the most important factors in automotive racing are the capabilities of the driver and the mechanical soundness of the automobile itself. In the latter regard, large amounts of time, money and effort are spent optimizing equipment performance, both mechanically and aerodynamically. A fast car often times being the difference between winning and losing any given race.

While many exotic, technical modifications may be made to race cars to make them go faster, the most basic problem is to be assured that the engine will start so it can compete. Conventionally, a DC starter motor and solenoid actuated, geared starter drive are mounted to the engine in proximity to a relatively large diameter flywheel ring gear, permanently mounted to the aft end of the engine crankshaft. Starting is achieved by engaging the flywheel ring gear with the starter drive and electrically turning the engine over via the starter motor, until self-sustaining internal combustion is achieved. Alternatively, the engine is manually rotated via external crank means or by physically pushing the car, while in gear, either by hand or with another automobile. In certain types of race conditions, where total vehicle weight is a concern, the starter motor and starter solenoid may be removed altogether and, in which event, they typically are temporarily reattached to start the engine.

In most of the above circumstances, however, it is still necessary to retain the flywheel ring gear in the drive train, regardless if an automatic or manual transmission is employed. Consequently, engine torque is affected by the weight of the flywheel, since it is necessary for the engine to continually turn the flywheel mass so long as the engine is running. While over long distances, the flywheel mass may not noticeably diminish vehicle performance, for shorter race course conditions, where more responsive engines are required, it is desirable that such mass not be included. Thus, more power is available to reach and maintain the speeds necessary to win races.

The present invention is accordingly intended to provide apparatus for selectively engaging/disengaging the flyweel from the drive train, independent of transmission type, so long as a starter drive motor is employed to start the vehicle.

SUMMARY OF THE INVENTION

It is accordingly a primary object of the present invention to provide apparatus for selectively engaging-/disengaging a starter driven flywheel ring gear from a vehicle drive train.

It is an additional object of the invention to provide a slide-actuated assembly mountable in the space between the crankshaft and transmission.

It is another object of the invention to provide a geared flywheel support assembly selectively meshing with an intermediate geared assembly mounted to the engine crankshaft.

It is a further object of the invention to provide a manual shift linkage for engaging/disengaging the flywheel.

It is a still further object of the invention to provide a solenoid-actuated shift mechanism for engaging/disengaging the flywheel.

The above objects and advantages are achieved in the presently preferred embodiment via an assembly comprising a geared drive hub mounted to the crankshaft and a transmission adapter assembly coupled to the transmission. Intermediate thereof, a geared, flywheel retaining hub is slidably mounted along the adapter assembly to selectively engage the geared drive hub during engine start or be disengaged therefrom during normal operation. In particular, the flywheel retaining hub includes an internal ring gear portion for mating with the gears of the drive hub. Shift means pivotally coupled to the adapter assembly and flywheel retaining hub selectively shifts the hub to and fro at desired times, while preventing inadvertent re-engagement.

Constructionally, the drive hub comprises a circular plate member including a number of spaced apart holes which bolt to the crankshaft. A gear containing flange, aft of the mounting plate, meshes with a coaxially positioned gear in the flywheel retaining hub, which also includes provisions for removably bolting various sized flywheels thereto. An annular grooved flange, aft of the flywheel, cooperates in various embodiments with either a manual or an automatic shift actuation assembly.

The transmission adapter hub, in turn, includes a cylindrical slideway which supports the grooved flange of the flywheel retaining hub. Associated mounting members are also provided for pivotally supporting the shift actuation assembly thereto. A stub shaft coaxially mounted along the longitudinal axis of the drive hub, flywheel retaining hub and transmission adapter couples the crankshaft to the transmission.

In one embodiment, a manual selector shaft arm is pivotally mounted to the transmission adapter assembly and coupled to the annular groove of the retaining hub to selectively displace the hub to and fro along the slideway of the transmission adapter. In an alternative embodiment, a solenoid-actuated pivot arm coupled to the transmission adapter, similarly shifts the flywheel retaining hub.

In yet another alternative manual transmission embodiment, using a modified mini-multidisk drive hub, the gear teeth of the drive hub are mounted forward of the hub's aft stop face relative to the mating gears of a conforming flywheel retaining hub.

The above objects, advantages and distinctions of the invention, among others, along with its detailed construction, will become more apparent upon reference to the following description with respect to the appended drawings. Before referring thereto, it is to be appreciated that the following description is made by way of the presently preferred embodiment only, with appropriate notation to presently contemplated modifications, and should not in any way be interpreted as self-limiting.

DESCRIPTION OF THE PREFERRED EMBODIMENT

Figure 1:
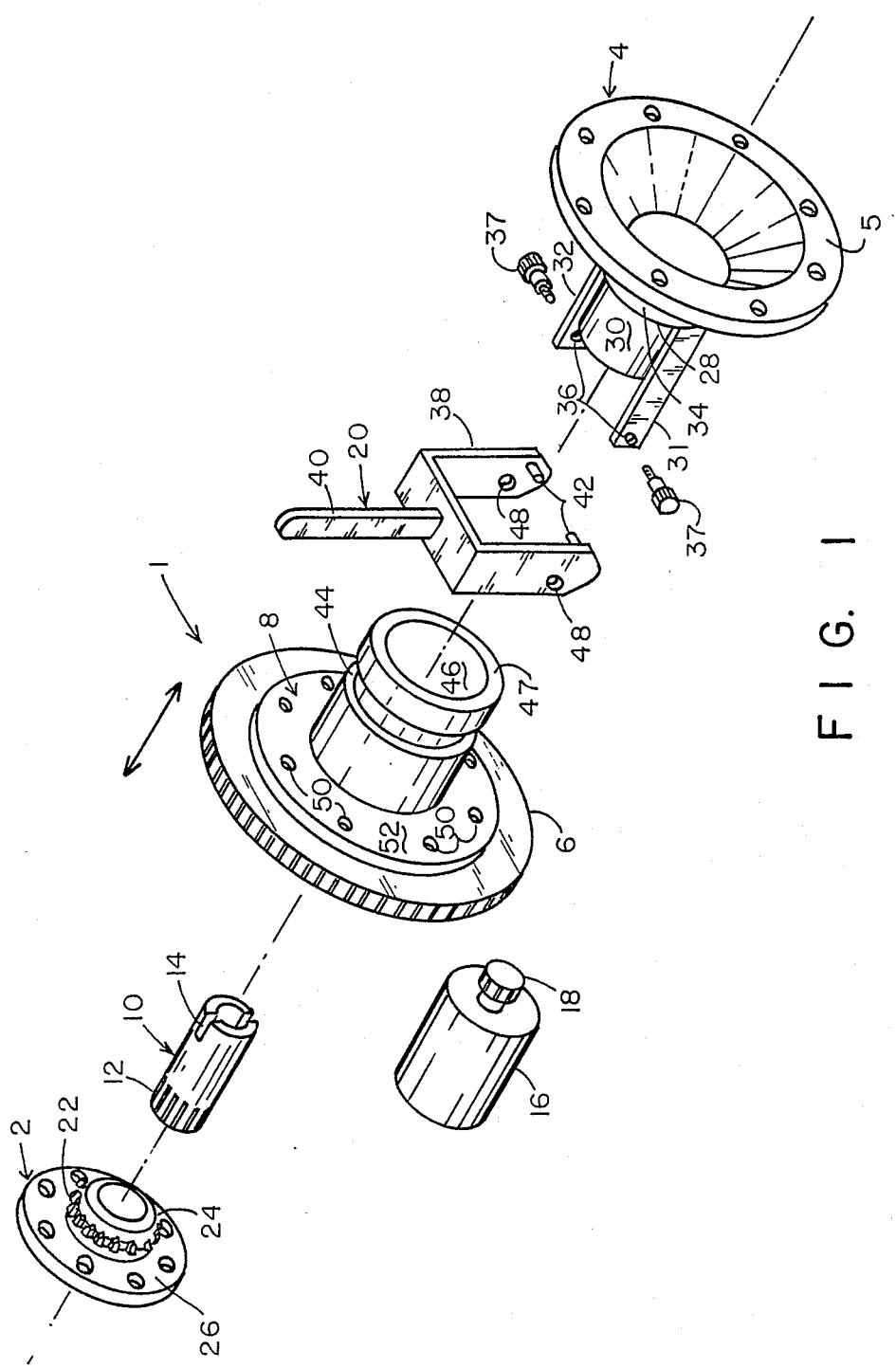
FIG. 1 shows an exploded assembly view in perspective of a manual shift embodiment of the invention intended for use with an automatic transmission.

Referring to FIG. 1, an exploded assembly view is shown in perspective of an embodiment of the present flywheel shifting assembly 1 which is intended for use with a powerglide-type automatic transmission without a torque converter. It is depicted independent of the engine crankshaft that normally mounts to the drive hub 2 and the transmission that mounts to the transmission adapter 4 at its aft, drilled flange portion 5. Coupled in-between the drive hub 2 and transmission adapter 4 is a flywheel ring gear 6, which is generally referred to hereinafter as a flywheel, and flywheel retaining hub 8. Coaxially mounted through and along the longitudinal outer axis of the entire assembly is a geared stub shaft 10 which mounts in meshed relation to gear teeth 13 in the drive hub 2 via gear teeth 12 at the shaft force end and to the front pump of an automatic transmission via the notched cutout 14 at the aft end of the shaft 10 with power transfer effectuated thereby in conventional fashion.

For a manual transmission, the stub shaft fore end is shaped to mount in a pilot bushing in the crankshaft and the notched aft end is approximately adapted to mount through a throw-out bearing retaining to the transmission. Where a mini-multidisk clutch assembly including a number of annular spring-biased clutch/pressure plates is used, power is transferred from the crankshaft to the clutch plate housing and thence via the pressure plates to the stub shaft and transmission via a geared coupling of each pressure plate to the stub shaft.

Mounted, in turn, to the engine in a conventional fashion is a DC starter motor 16 and to one end of which a solenoid-actuated, geared starter drive 18 selectively engages the teeth of the flywheel 6, during engine start. In lieu of being permanently mounted to the engine, it is to be appreciated that the starter motor 16 and drive 18 may be removably coupled via an appropriate linkage, when it is desirable to reduce vehicle weight.

As previously mentioned, engine start is a short-lived event and for the advantages of which it is preferable not to have to pay an on-going penalty of reduced engine torque. Once the engine is starter, the mass of the flywheel 6 becomes extraneous relative to the desired operation of the drive train and wherein it is desired to apply all possible power to the drive wheels. In the embodiment of FIG. 1, therefore, a manual shift arm 20 is pivotally mounted to the transmission adapter plate 4 to selectively, slidably move the flywheel 6 left and right, into and out of engagement with the drive hub 2. When engaged with the drive hub 2, gear teeth internal to the flywheel retaining hub 8 mesh with the gear teeth 22 on the hub flange 24. The maximum forward stroke of the flywheel retaining hub 8 is limited via a stop face 26 just forward of the gears 22. In a fully retracted position, the flywheel retaining hub 8 is retracted against a stop shoulder 28 of the transmission adapter 4. A cylindrical slideway portion 30 of the adapter 4 is coaxially aligned with a mating elongated aft flange portion 45 of the flywheel retaining hub 8 and restrains the movement of the hub 8 along the center, longitudinal axis of the drive train assembly. A pair of pivot arms 31 and 32 extending forward from a conical flange portion 34 of the transmission adapter 4, each include a threaded hole 36 whereat shouldered screw fasteners 37 pivotally secure the shift selector 20 thereto.

With particular attention directed to the shift selector 20, it is generally constructed in a wishbone shape having a lower inverted U-shaped yoke member 39 and an upper welded handle member 40. A pair of rigid pins 42 extend inwardly from the inner, end faces of the yoke member 38's arms engage an annular groove 44 in the outer surface of the flange 46, aft of the flywheel 6. Each pin 42 is constructed of a hardened steel, while the groove 44 is similarly faced with a hardened material, such that, over time, the pins 42 do not induce excessive wear in the groove 44—it being appreciated that during engine start, the flywheel retaining hub 8 rotates relative to the pins 42.

In lieu of the foregoing pin mounting, it is to be appreciated that various modifications may be made to the shift selector 20 to achieve a comparable straight line shifting action. For example, the yoke 38 may be constructed more in the form of an O-shape with an intermediate bearing mounted in the groove 44, and whereby the hub 8 is able to rotate freely relative to the shift selector 20, yet move axially to and fro therewith as the lever 40 is pivoted. In lieu of engaging the annular groove 44, alternatively, one or more shift assemblies may be employed to engage the forward and aft faces of the flywheel 6 to exert appropriate directional travel. In particular, the shift selector 20 may utilize a yoke member 38 having end rollers suspended to selectively engage the fore and aft flywheel faces to exert appropriate axial motion. Even further, an intermediate spring-assist assembly may be employed to facilitate shifting and/or prevent the flywheel retaining hub 8 from disengaging from the drive hub 2 or re-engaging the drive hub 2, once fully retracted to the stop face 28. At present, this latter function is accomplished with an over-center cam action at the shift selector 20 which is attained by offsetting the mounting holes 48 of the yoke 38.

With continuing attention to the flywheel retaining hub 8, it is to be recalled that the flywheel 6 is removably mounted to the hub 8 via a number of bolt fasteners (not shown) mounted through the holes 50 of the mounting flange 52. Depending upon the type of engine, it is also to be appreciated that different diameter flywheels may be required. Accordingly, the holes 50 are spaced to accommodate each of the most frequently encountered flywheels 6.

Figure 2:
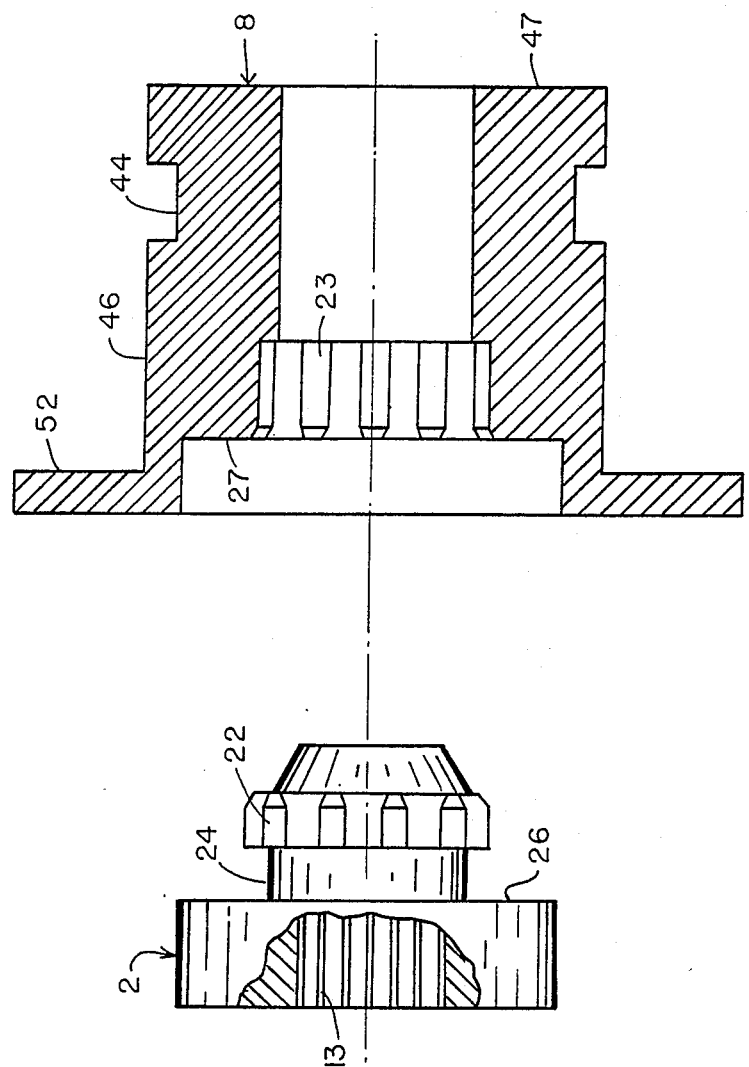
FIG. 2 shows a partially sectioned cross-section view through the drive hub and flywheel retaining hub of FIG. 1.

Turning attention next to FIG. 2, a cross-section view is shown in partial cutaway of the drive hub 2 in spaced-apart relation to the flywheel retaining hub 8. From this view, a better appreciation is attained of the gear action which occurs when the retaining hub 8 is fully extended to induce its gear teeth 23 to engage the teeth 22 of the drive hub 2. During this condition, the drive hub 2 fully nests within the hub 8, with the teeth 22 and 23 meshed and the stop faces 26 and 27 contacting one another.

Also shown in the partially cutaway portion of the drive hub 2 are the teeth 13 which mate with the teeth 12 of the stub shaft 10. Furthermore, it is to be noted that the bore of the flywheel retaining hub 8 is of a diameter slightly larger than that of the slideway 30 and also of a comparable length such that, when fully retracted, the rear hub face 47 contacts the stop face 28 of the transmission adapter 4, without the forward end of the slideway 30 contacting the drive hub 2.

Figure 3:
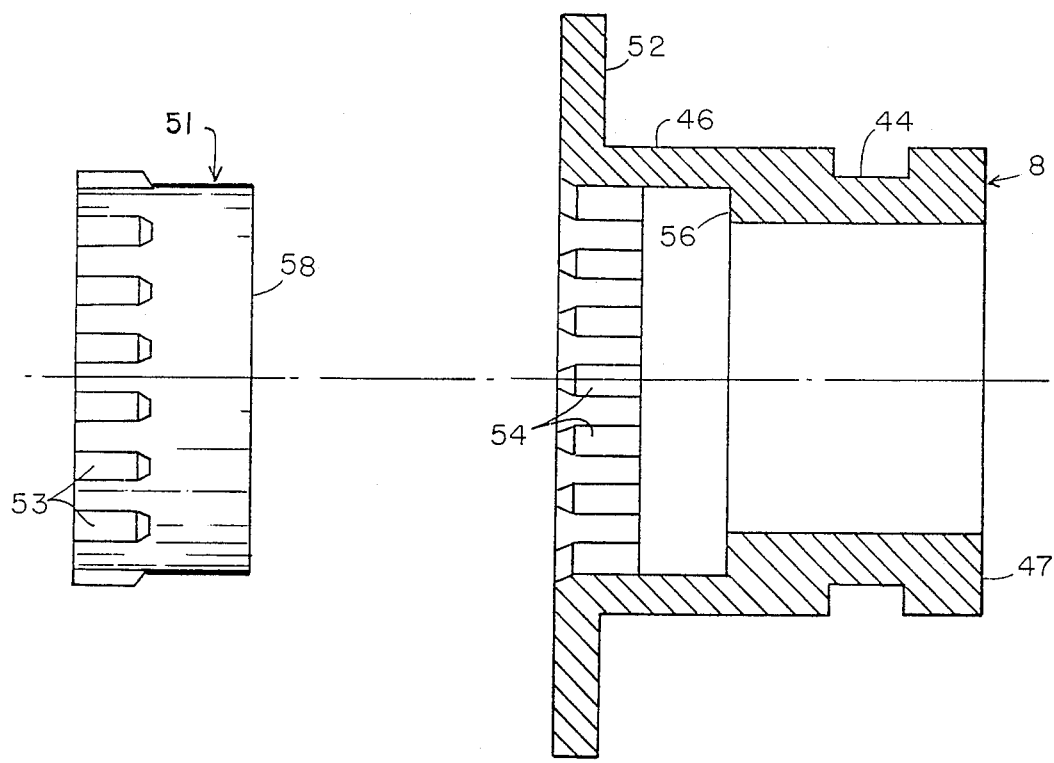
FIG. 3 shows a cross-section view through an alternative mini-multidisk drive hub used in conjunction with a manual transmission embodiment of the invention.

Depending upon the car's transmission, and most particularly for those situations where a standard transmission is used, a different type of drive hub 2 may be employed. In this regard, attention is directed to FIG. 3 and wherein an alternative embodiment is shown in cross-section of a modified commercially available drive hub 51 which includes a plurality of internal mini-multidisk clutch/pressure plates (not shown) and which, as mentioned, mounts to the crankshaft and stub shaft 10. Gear teeth 53 are provided about the outer periphery of the hub 51, although now they extend rearward from the front face instead of along a rear flange portion. Accordingly, the bore of the retaining hub 8 is modified to provide a mating recess. That is, mating gear teeth 54 are positioned more forwardly of a deeper recessed stop face 56 which recess again accommodates the nested mounting of the hub 50 when the stop faces 58 and 56 contact one another. Alternatively, it is to be appreciated that the hub 2 might be incorporated into a conventional clutch/pressure plate assembly to achieve a comparable power transfer.

Figure 4:
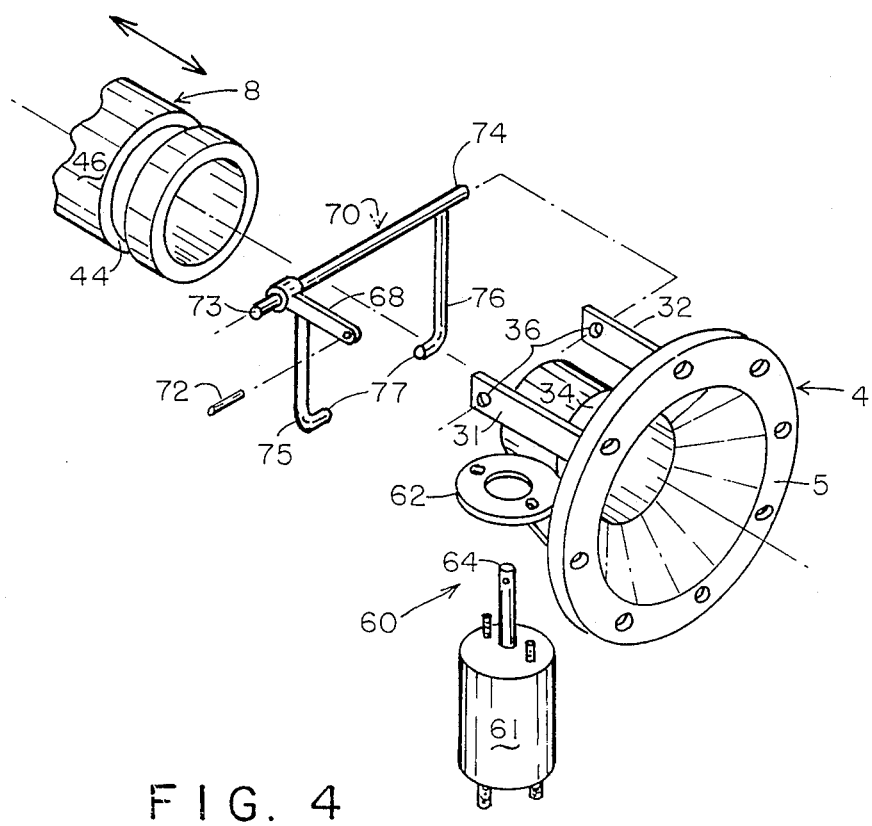
FIG. 4 shows a partially exploded perspective view of an alternative automatic shift mechanism.

Appreciating also that some drivers may prefer an automatic shift selector assembly 20, attention is next directed to FIG. 4 and wherein a solenoid-actuated shift assembly 60 is shown relative to the transmission adapter 4 and flywheel retaining hub 8. For this embodiment, a DC solenoid 61 is mounted to a mounting plate 62, extending from the conical transition face 34 of the adapter 4. A plunger 64 extends upwardly through the plate 62 and is coupled via a retaining pin fastener 72 to an extension arm 68 of a pivotally mounted inverted U-shaped yoke member 70. The yoke 70 includes a pair of upper, outwardly extending side pivots 73 and 74 which mount within the pivot holes 36 of pivot arms 31 and 32. The yoke arms 75 and 76, in turn, include bent pivot ends 77 which are captured in the flywheel retaining hub groove 44.

Thus, upon actuation of the solenoid 61, the plunger 64 induces yoke 70 to pivot and extend or retract the retaining hub 8. As before, a spring-assist assembly and throw lockout means (not shown) may be included to assure the retention of the hub 8 at its extreme ends of travel. Furthermore, the solenoid 61 may normally be biased to its retracted position to minimize against the possibility of the retaining hub 8 engaging the drive hub 2 at racing speeds. In the prior manual shift embodiment, it is to be recalled an over-center cam action was used to prevent against undesired re-engagement.

While the present invention has been described with respect to its presently preferred embodiment and various alternative embodiments and modifications thereto, it again is to be appreciated that the foregoing description is intended to be illustrative only and not all-encompassing. Yet other modifications may be effectuated by those of skill in the art without departing from the spirit and scope of the present invention. It is accordingly contemplated that the following claims should be interpreted to include all those equivalent embodiments within the spirit and scope thereof.

What is claimed is:

1. An automotive engine starting apparatus comprising:
   (a) a plate member mountable to a crankshaft of an internal combustion engine and including a rearwardly extending toothed flange;
   (b) a slideway containing adapter member mounted between said engine and a rearwardly positioned transmission;
   (c) a hub member slidably mounted along said adapter member slideway, supporting a flywheel ring gear mounted thereto and having longitudinal bore containing a plurality of gear teeth positioned to mesh with those of said plate member;
   (d) means coupled to said hub member for selectively engaging and dispensing the gear teeth of said hub member from those of said plate member; and
   (e) means selectively engageable with said flywheel ring gear when the teeth of said plate and hub members are meshed for rotating said flywheel and engine crankshaft to achieve self-sustaining engine operation.

2. Apparatus as set forth in claim 1 wherein said gear engaging means comprises:
   (a) a lever arm having at least one pin member projecting therefrom;
   (b) an annular groove formed in said hub member to receive said lever arm pin; and
   (c) means for pivoting said lever arm to slide said hub member to and fro along said slideway.

3. Apparatus as set forth in claim 2 wherein the pivot point of said lever arm is positioned such that the throw position of said lever arm is self sustaining on either side of an over-center throw position which occurs rearwards of the point where the gears of said plate and hub members first engage one another.

4. Apparatus as set forth in claim 1 including a first stop shoulder at said plate member for limiting the forward travel of said hub member and a second stop shoulder at said adapter member for limiting the rearward travel of said hub member.

5. Apparatus as set forth in claim 1 wherein said means for selectively engaging said hub and plate members comprises:
   (a) a lever arm pivotally mounted to said adapter member and having at least one pin member projecting therefrom;
   (b) an annular groove formed in said hub member for receiving said pin member; and
   (c) a solenoid mounted to said adapter member and coupled to said lever arm for pivoting said lever arm and sliding said hub member to and fro along said slideway.

6. Apparatus as set forth in claim 1 wherein said hub member includes a plurality of mounting holes and hole spacings whereby any of a variety of different flywheel ring gears may be coupled thereto.

7. Apparatus as set forth in claim 1 wherein said plate member mounts to the engine crankshaft and includes a longitudinal bore wherefrom a stub shaft concentrically extends in power transfer relation to the vehicle transmission.

8. In a starting system for an internal combustion engine powered vehicle having separately powered means for selectively rotating an engine crankshaft to obtain self sustaining operation, apparatus comprising:
   (a) a first geared member mounted to an engine crankshaft;
   (b) a slideway member mounted in coaxial alignment with and rearward of said crankshaft;
   (c) a second geared member slidably mounted along said slideway and supporting a flywheel ring gear; and
   (d) means coupled to said second geared member for selectively displacing said second geared member into meshed engagement with said first geared member and such that said flywheel ring gear simultaneously engages with said rotating means during engine starting and disengaging said flywheel ring gear from power transfer relation with said engine once started.

9. Automotive engine starting apparatus comprising:
(a) a gear member mountable to a crankshaft of an internal combustion engine and including a plurality of radially disposed gear teeth;
(b) slideway means mounted between said engine and a rearward mounted transmission;
(c) a hub member concentrically mounted relative to said slideway means, supporting a flywheel ring gear, and including a plurality of radially disposed gear teeth positioned to mesh with the teeth of said gear member;
(d) lever-actuated means coupled to said hub member for selectively slidably engaging and disengaging the gear teeth of said hub member with and from those of said gear member; and
(e) means selectively engageable with said flywheel ring gear when the teeth of said plate and hub members are meshed for rotating said flywheel and engine crankshaft to achieve self-sustaining engine operation.

10. Automotive engine starting apparatus comprising:
(a) a first geared member coupled to an engine crankshaft;
(b) a slideway containing adapter member mounted between said engine and a rearwardly positioned transmission;
(c) a hub member slidably mounted along said adapter member slideway, supporting a flywheel ring gear mounted thereto and having a longitudinal bore containing a plurality of gear teeth positioned to mesh with those of said plate member;
(d) a lever arm including at least one pin projecting therefrom and mounted in an annular groove in said hub member;
(e) means for pivoting said lever arm having self sustaining throw positions whereat a first position the gear teeth of said first geared member and hub member engage one another and in a second position the gear teeth of said first geared member and hub member are disengaged; and
(f) means selectively engageable with said flywheel ring gear when the teeth of said plate and hub members are meshed for rotating said flywheel and engine crankshaft to achieve self-sustaining engine operation.

11. Apparatus as set forth in claim 10 wherein said pivot means includes a solenoid coupled to pivot said lever arm.

12. Automotive engine starting apparatus comprising:
(a) a plate member mountable to an engine crankshaft and including a rearwardly extending toothed flange;
(b) a slideway containing adapter member mounted between said engine and a rearwardly positioned transmission;
(c) a hub member slidably mounted along said adapter member slideway, supporting a flywheel ring gear mounted thereto and having a longitudinal bore containing a plurality of gear teeth positioned to mesh with those of said plate member;
(d) cam acting pivot means slidably engaging and disengaging said plate and hub members with one another and said flywheel ring gear; and
(e) means selectively engageable with said flywheel ring gear when the teeth of said plate and hub members are meshed for rotating said flywheel and engine crankshaft to achieve self-sustaining engine operation.

* * * * *